Aug. 18, 1970  D. N. McCARTNEY ET AL  3,524,563

MOBILE LOADING APPARATUS

Filed May 24, 1968  12 Sheets-Sheet 1

INVENTORS
Duane N. McCartney
Arnold Duerksen
BY Flehr, Hohbach, Test,
Albritton & Herbert
Attorneys

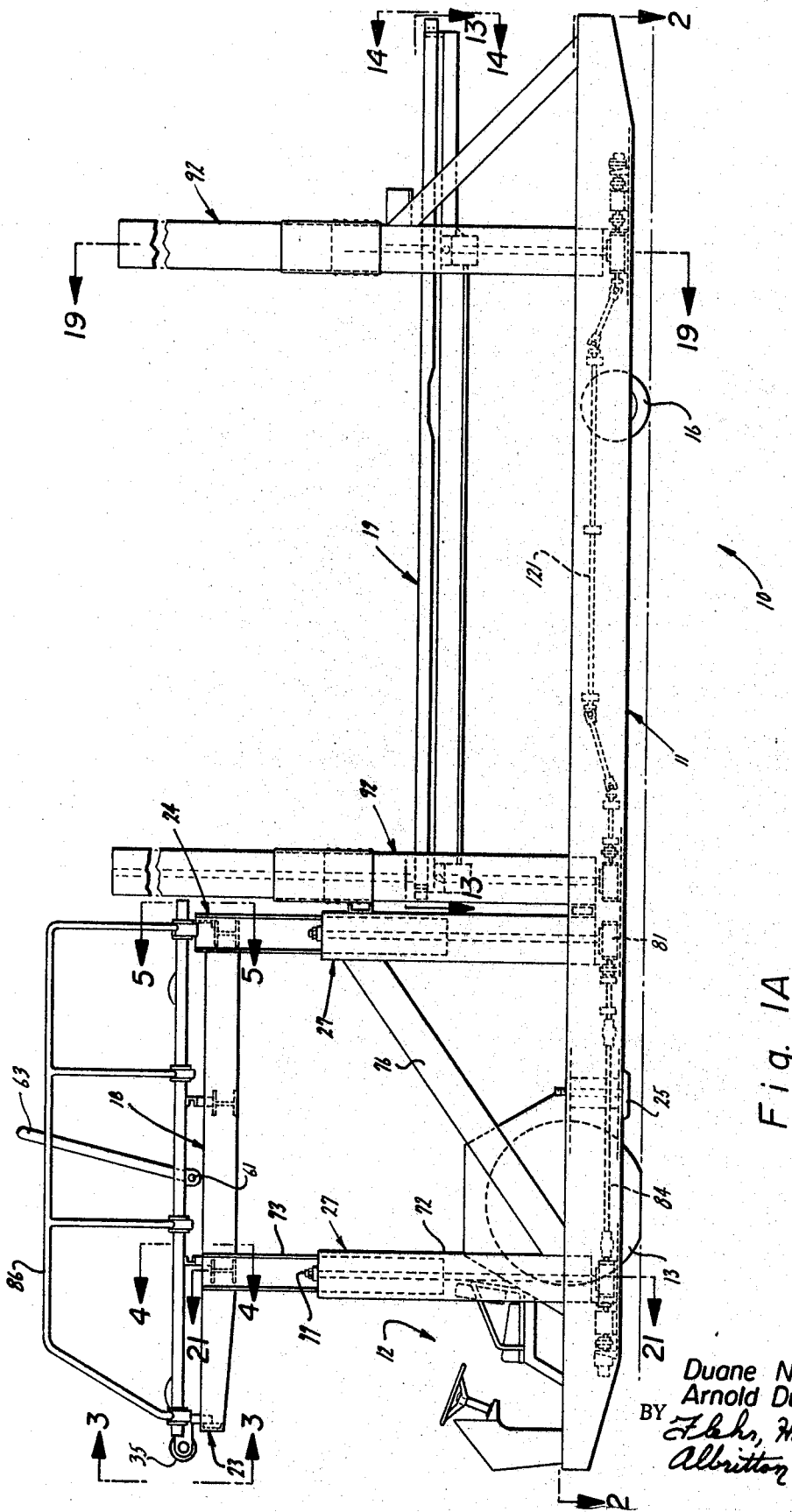

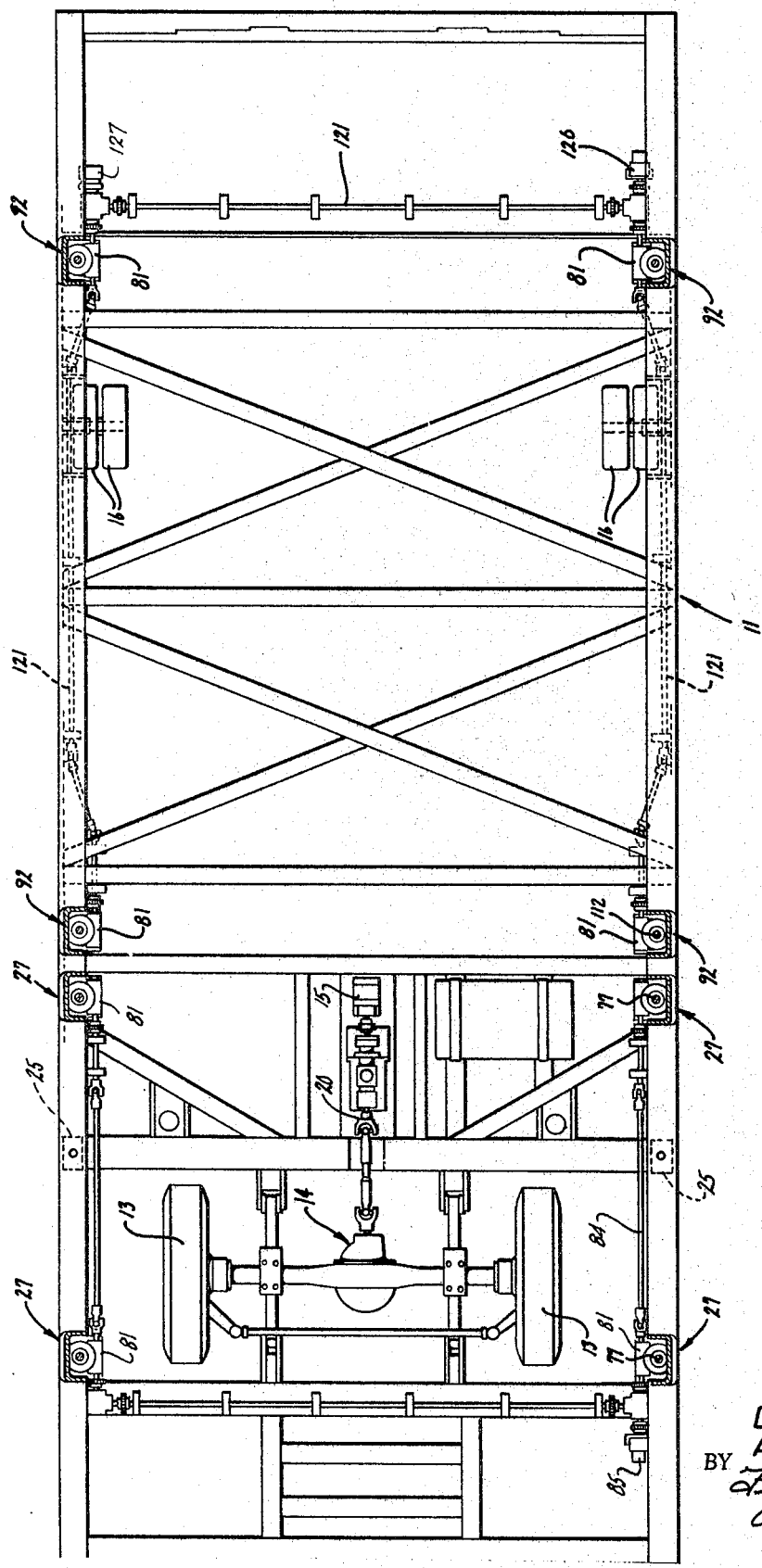

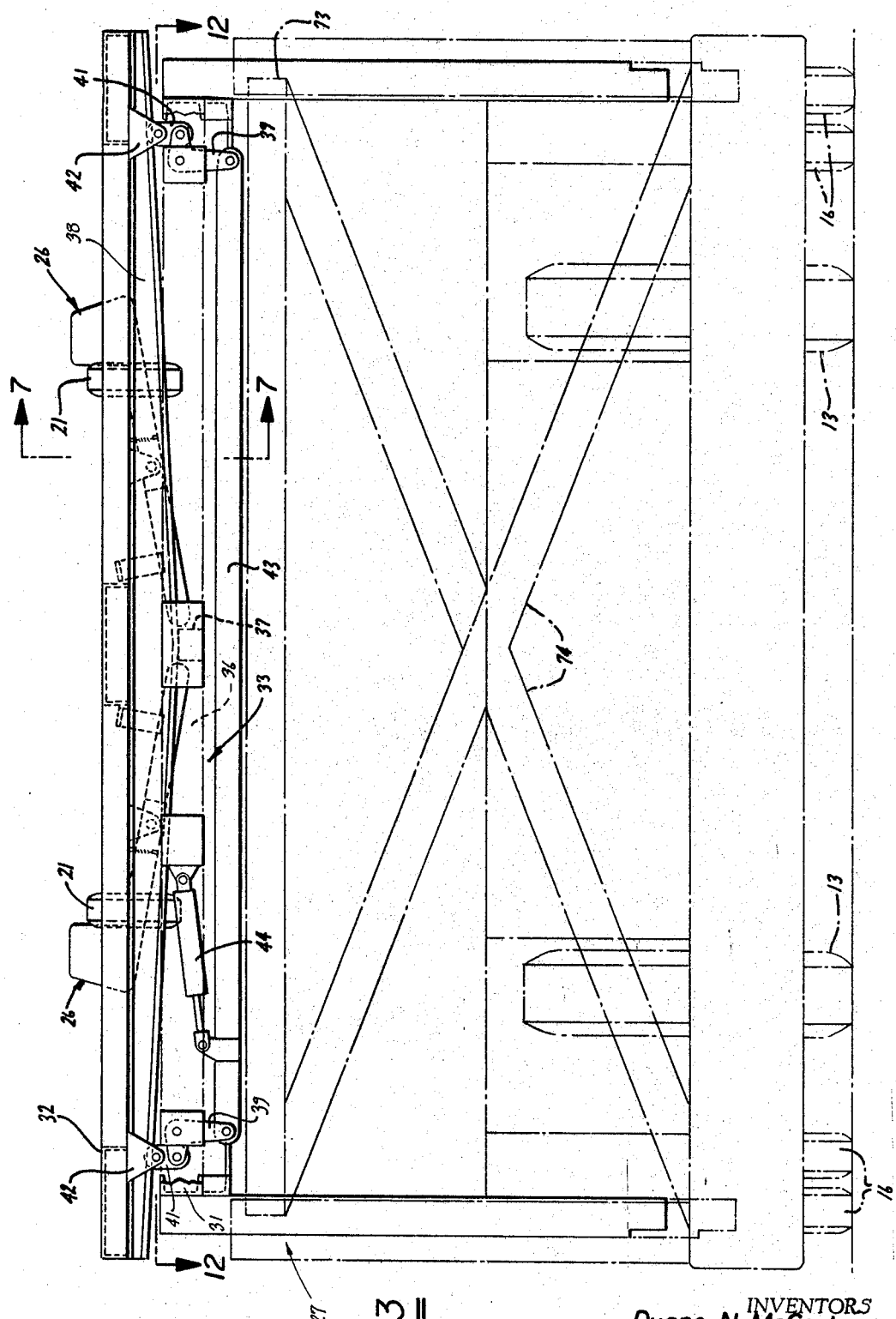

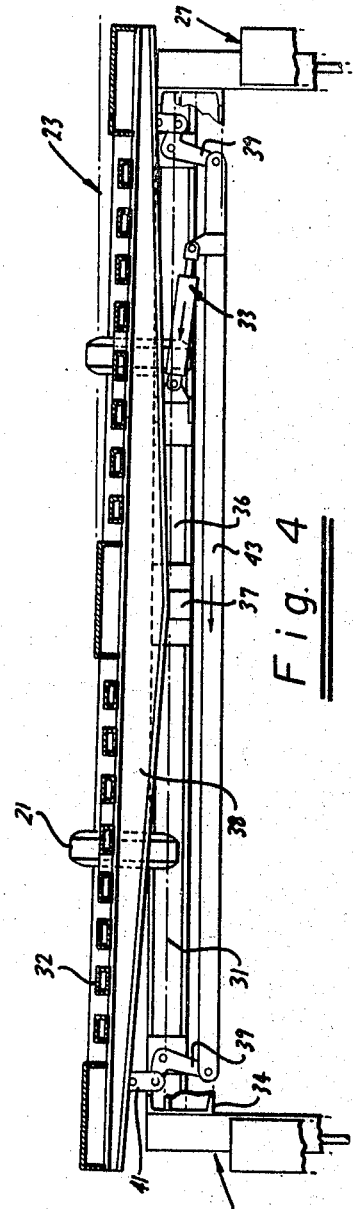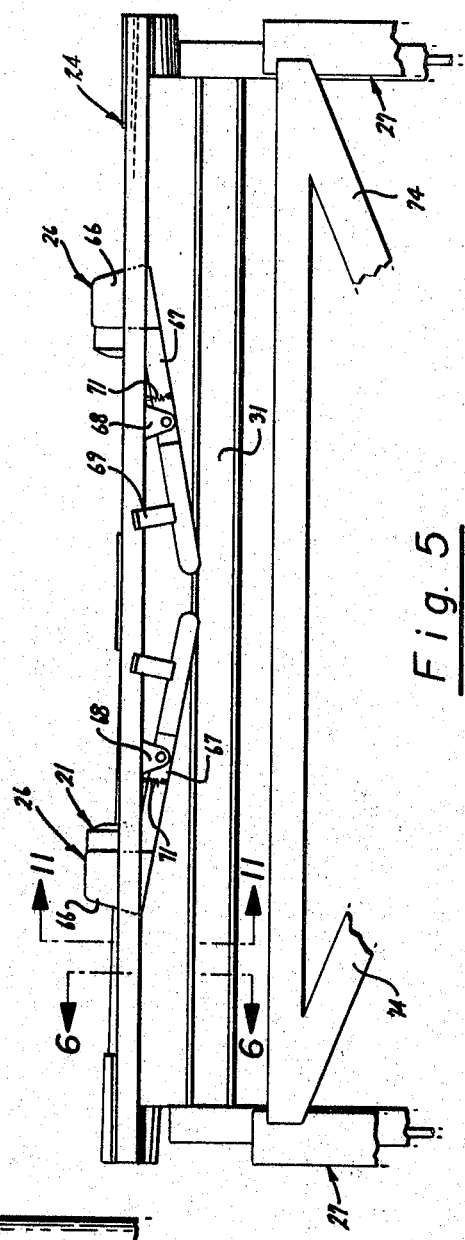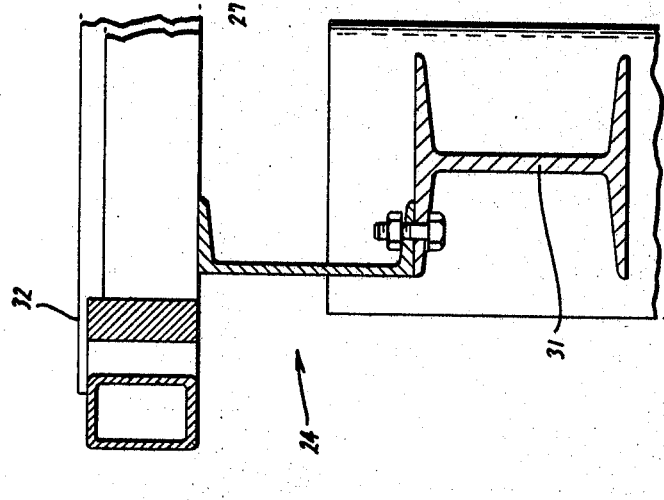

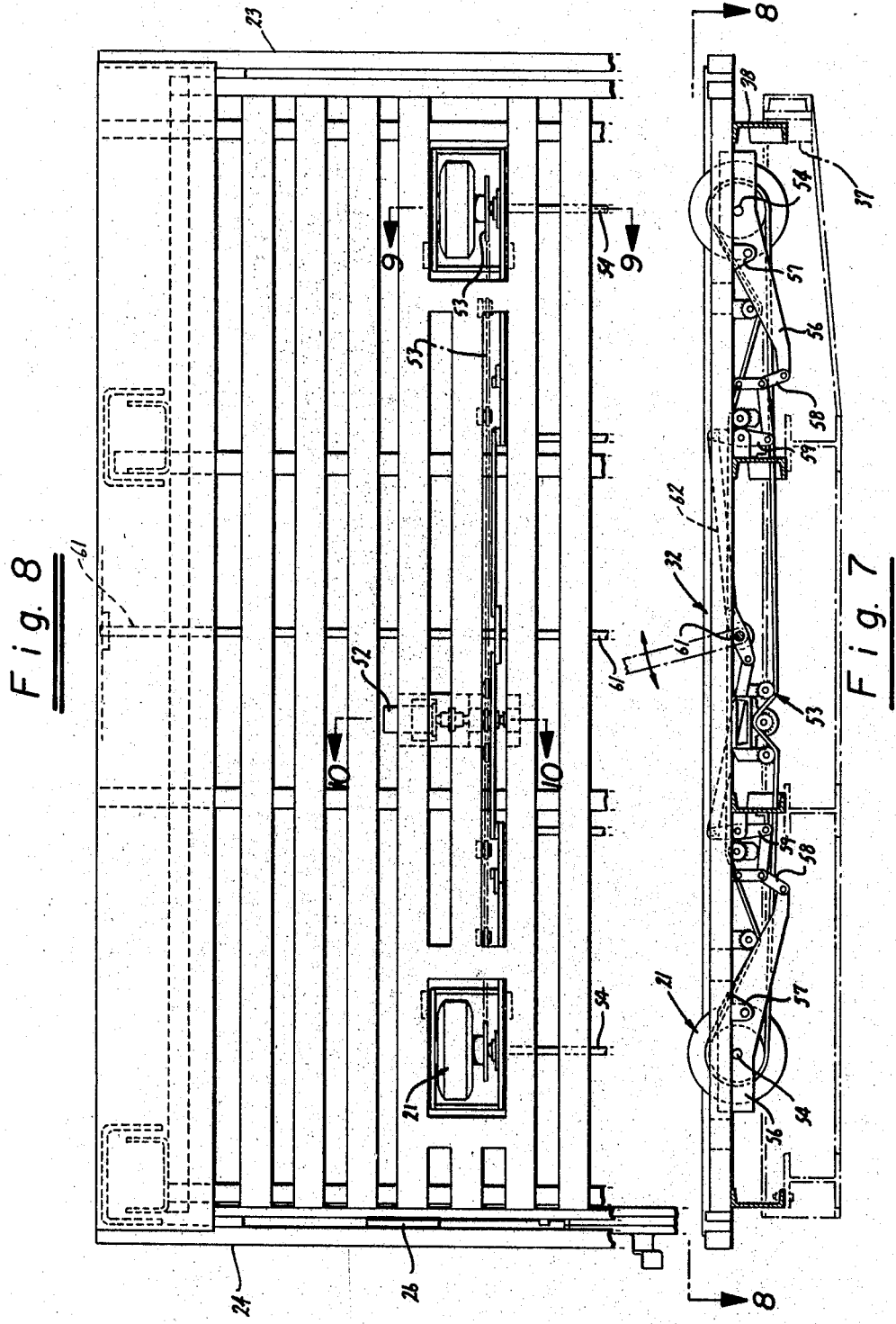

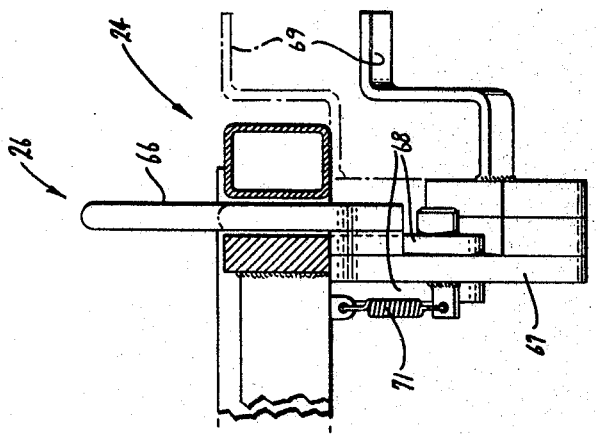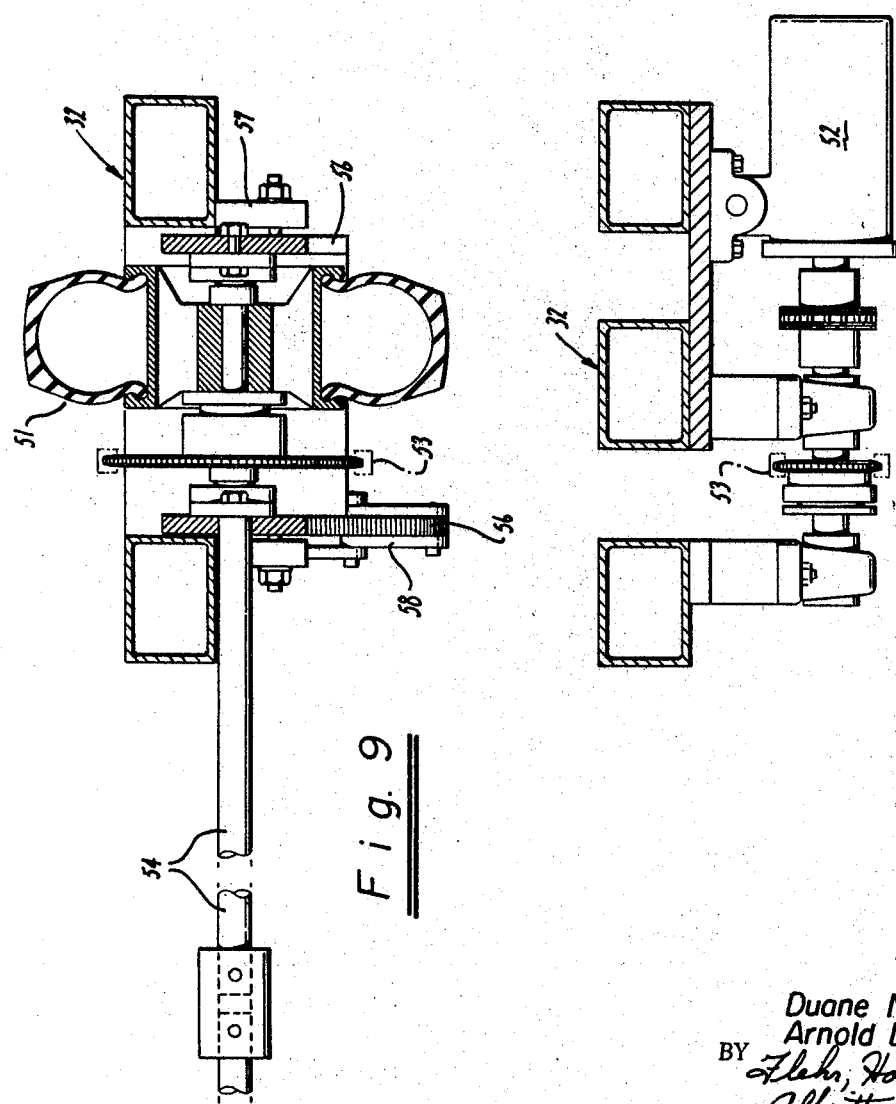

INVENTORS
Duane N. McCartney
Arnold Duerksen
BY Flehr, Hohbach, Test,
Albritton & Herbert
Attorneys

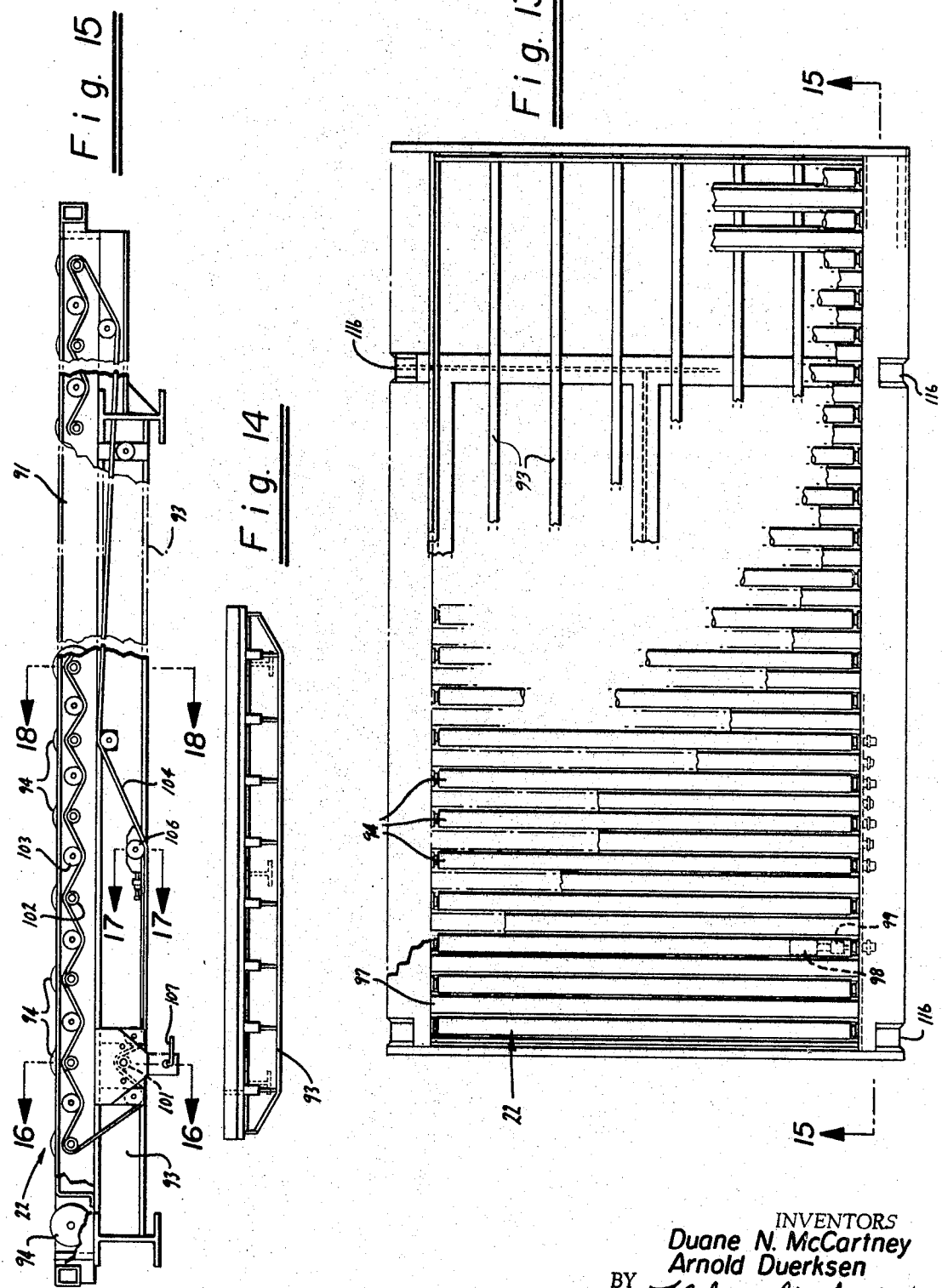

INVENTORS
Duane N. McCartney
Arnold Duerksen
BY
Attorneys

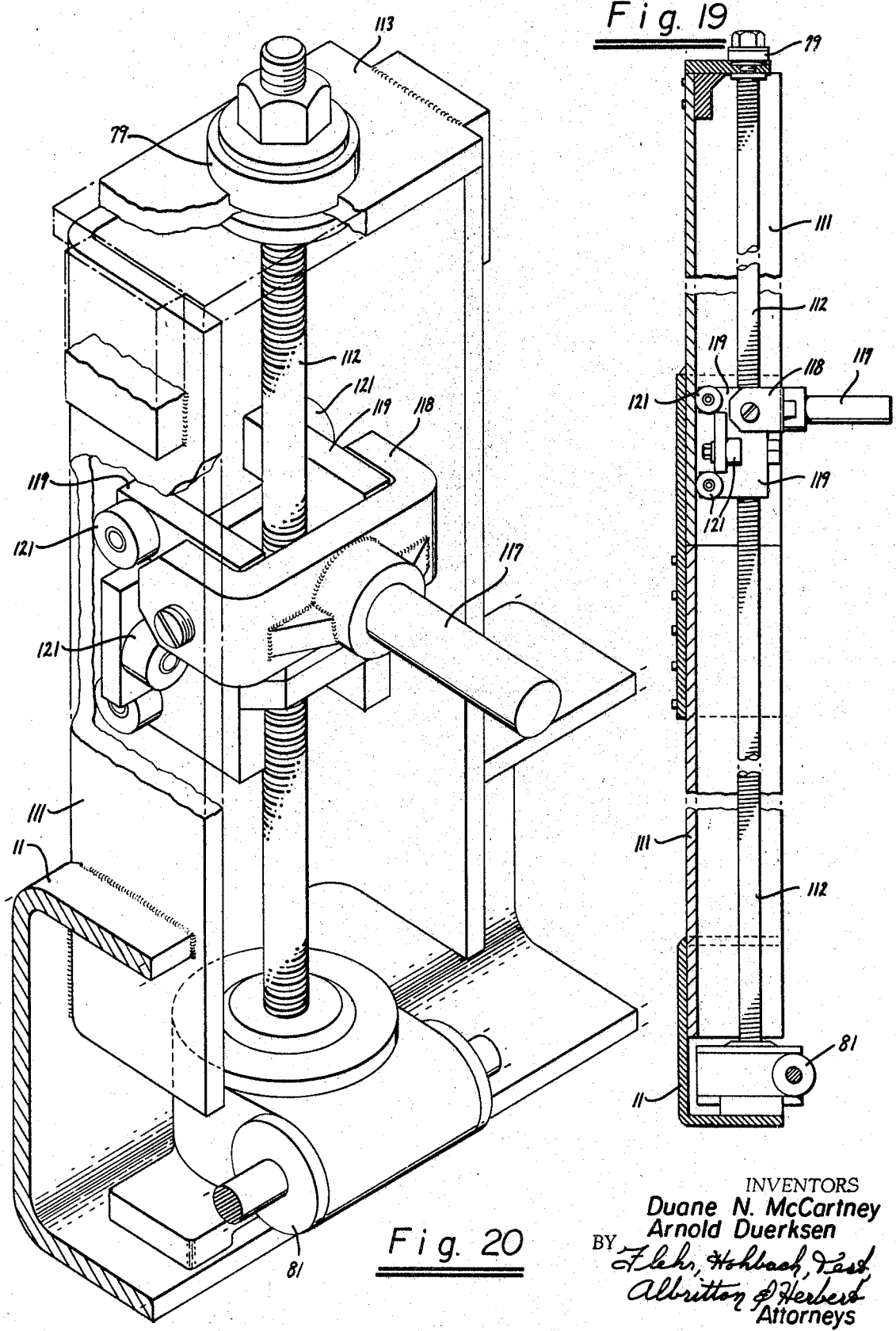

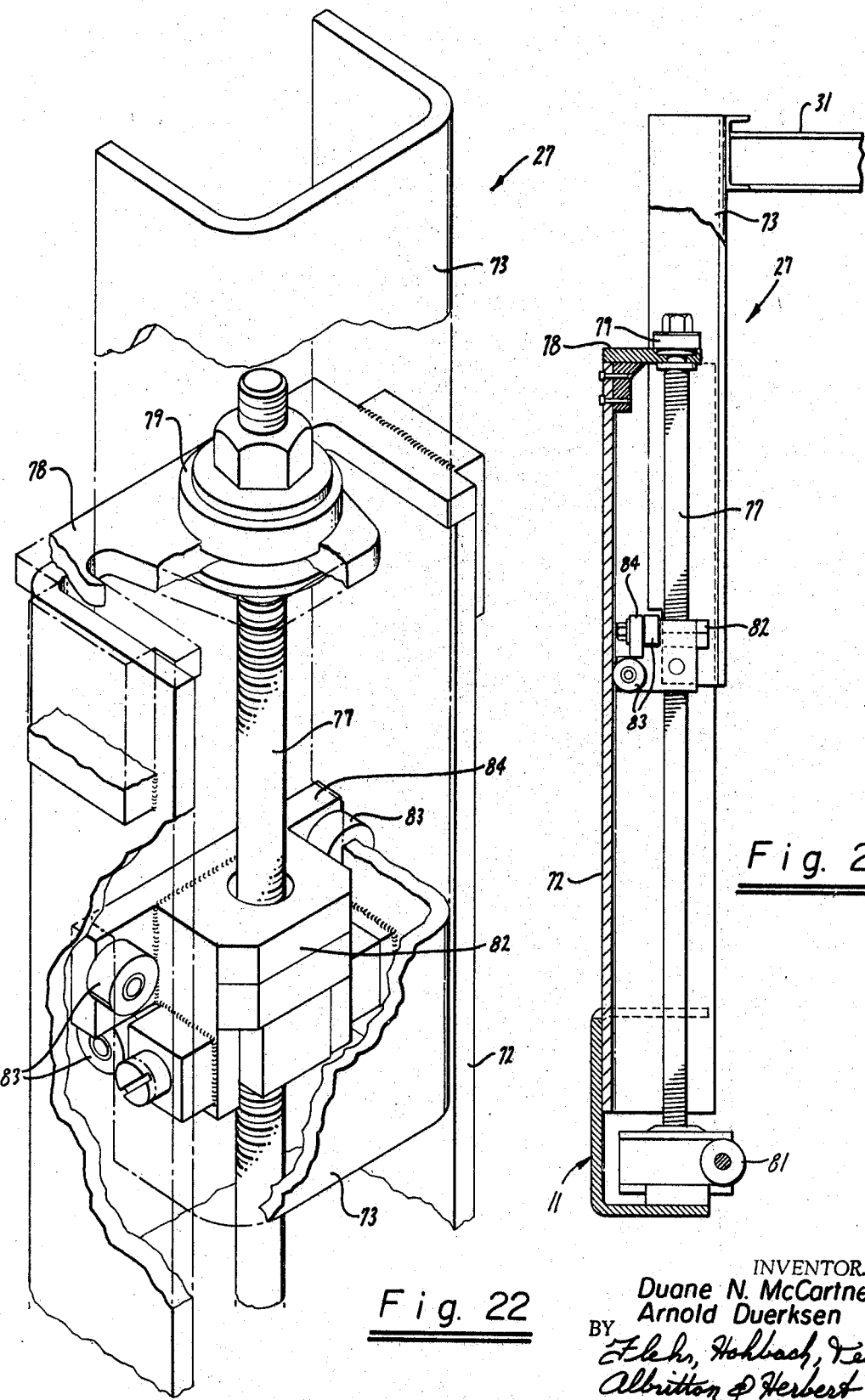

United States Patent Office 3,524,563
Patented Aug. 18, 1970

3,524,563
MOBILE LOADING APPARATUS
Duane N. McCartney, Pebble Beach, and Arnold Duerksen, Salinas, Calif., assignors, by mesne assignments, to Cochran Western Corporation, Salinas, Calif., a corporation of California
Filed May 24, 1968, Ser. No. 731,933
Int. Cl. B60p 1/44
U.S. Cl. 214—512      14 Claims

ABSTRACT OF THE DISCLOSURE

A mobile apparatus for loading and unloading of aircraft including passengers or cargo, and particularly heavy palletized cargo. A forward elevator arranged to adjust to the height and to align with the loading hatch of an aircraft, preferably cooperates with means to warp or tilt at least a part of the elevator's receiving platform to compensate for tilting of the aircraft. A rear elevator raises passengers or cargo to the height of the forward elevator and aligns with the forward elevator. In one form, conveyors move cargo between the rear and forward elevators. The rear elevator may also be disposed in a lowered position to facilitate movement of passengers or cargo to an associated loading dock.

---

This invention relates to passenger and freight handling apparatus, and particularly to improved mobile apparatus useful in the loading and unloading of aircraft and like commercial carriers.

The increase in the number of passengers and tonnage of freight moved by aircraft in recent years has been dramatic, and is especially notable as respects the weight and bulk of cargo which can be readily accommodated in the large multi-jet aircraft. An efficient system has been devised for moving cargo from a storage area into the body of the aircraft by first carrying the cargo on a transporter vehicle to a loader positioned adjacent to the cargo door of the aircraft. The loader receives the cargo from the transporter and lifts the material to the level of the plane's cargo compartment for easy loading into the aircraft fuselage. Although small packages including baggage and the like may be delivered to the cargo compartment on an inclined conveyor loader, palletized cargo and bulky items are preferably handled on a cargo loader capable of moving the cargo in an horizontal attitude from the cargo transporter to the cargo door in the fuselage.

In view of the manifold types of aircraft equipped for carrying cargo, it is apparent that the cargo doors of the aircraft are disposed at varying elevations from the ground and that in certain cases the lower edge of the cargo door, or support surfaces of the cargo compartment of the aircraft, may be other than horizontal. More specifically, the loading surfaces of the aircraft may be slightly canted or tilted with respect to the horizon as a result of variances in attitude, condition of loading, and so forth. To permit easy loading of bulky cargo and palletized freight in these circumstances it is desirable that the cargo loader be capable of accommodating the canted attitude of the cargo door so that freight may be moved into the body of the aircraft with a minimum of jarring and vertical movement which could be damaging to both the freight and the aircraft.

At large international airports elaborate and expensive passenger accommodations have been constructed. These accommodations often include extensible ramps which selectively project from the terminal building to the passenger loading door of the aircraft. The ramps serve to protect passengers from the elements and to obviate the use of stairs between ground level to the aircraft cabin, stair climbing being strenuous to the infirm and elderly. However, at the smaller municipal airports, or in the case of the smaller airlines, the volume of passenger traffic does not permit installation of the aforementioned passenger handling facilities. Instead, passengers must walk in all the varieties of weather between the airport terminal and the aircraft so that the aircraft generally taxi under power as close as is feasible to the terminal building. When two or more aircraft are simultaneously taking on or discharging passengers, congestion results. It is highly desirable therefore, that passengers be conveyed from the terminal building to the aircraft in a manner protected from the weather elements, and in a manner which makes it unnecessary that the passenger climb or descend stairs for entry or egress from the aircraft.

SUMMARY OF THE INVENTION AND OBJECTS

In summary, the invention pertains to a mobile loading apparatus for carrying heavy cargo and passengers. The apparatus includes a steerable frame or chassis powered for ground movement. A forward or holding elevator and a rear or load-transferring elevator are arranged on the chassis. In one preferred embodiment (FIGS. 1–22), each elevator is provided with a platform equipped with a bi-directional conveyor. In all embodiments, the forward or holding elevator can be equipped with mechanisms for laterally tilting the loading or terminal end of the elevator platform, for alignment with canted or tilted support surfaces of the transport vehicle. In its cargo handling configuration, the instant invention is useful for transferring cargo with respect to aircraft, trucks, railroad cars and the like. In a second preferred embodiment (FIG. 23), the chassis is equipped with a passenger compartment for exit and entry to the elevators, each of which is provided with a passenger shielding enclosure. When the rear elevator is in a lowered condition, passengers may walk from the passenger compartment into the enclosed rear elevator which thereafter may be raised to an elevated position in alignment with the forward elevator. Passengers may then walk from the rear to the forward elevator and thence into the cabin of the aircraft.

An object of this invention is to provide an improved mobile loading apparatus for loading or unloading either heavy bulky items of cargo or passengers with respect to aircraft.

Another object of this invention is to provide an improved cargo handling apparatus for loading or unloading heavy, bulky items of cargo such as pre-loaded containers and pallets with respect to carriers such as aircraft, trucks or rail cars, ships and the like.

Still another object of this invention is to provide cargo handling apparatus of the type described that readily accommodates the loading and unloading of cargo from aircraft, irrespective of the attitude of the cargo compartment with respect to the horizontal.

Yet another object of this invention is to provide in cargo handling apparatus of the type described, an improved elevator structure carried by one end of a mobile transporter and selectively movable between warped and horizontal conditions so as to accommodate selective loading and unloading movements of cargo between the cargo handler and the aircraft body.

Still another object of the invention is to provide in a loading apparatus of the type described, improved linkage means for tilting or warping an elevator support platform or conveyor into alignment with the door of the aircraft, truck or other vehicle being loaded or unloaded.

Yet another object of the invention is to provide a mobile passenger loading apparatus wherein the passengers are protected from the elements, during transport between the aircraft and terminal building, and which eliminates the necessity of climbing or descending stairs when entering or leaving the aircraft.

A further object of the invention is to provide a loading apparatus of the type described wherein the support platform is mobile so that the apparatus may be employed both as a transport vehicle and as a cargo handling means.

These and other objects of the invention will be apparent from the following description of the exemplary embodiments, and from the drawings.

BRIEF DESCRIPTION OF THE DRAWINGS

FIG. 1A is a side elevational view of the apparatus shown in FIG. 1;

FIG. 2 is a horizontal section along the line 2—2 of FIG. 1A;

FIG. 3 is an enlarged end view in the direction of the arrows 3—3 of FIG. 1A, showing in solid lines the terminal or loading end of the forward elevator and, in broken lines, the supporting structure for the forward elevator;

FIG. 4 is a vertical section, on a reduced scale, along the line 4—4 of FIG. 1A;

FIG. 5 is a view like FIG. 4 along the line 5—5 of FIG. 1A;

FIG. 6 is an enlarged vertical section along the line 6—6 of FIG. 5;

FIG. 7 is a longitudinal vertical section along the line 7—7 of FIG. 3;

FIG. 8 is a partial plan view along the line 8—8 of FIG. 7;

FIGS. 9 and 10 are each partial sectional views along the lines 9—9 and 10—10, respectively, of FIG. 8;

FIG. 11 is an enlarged vertical section along the line 11—11 of FIG. 5;

FIG. 13 is a plan view of the rear elevator along the line 13—13 of FIG. 1A;

FIG. 14 is an end view of the rear elevator along the line 14—14 of FIG. 1A;

FIG. 15 is a longitudinal section of the rear elevator along the line 15—15 of FIG. 13;

FIG. 19 is an enlarged vertical section along the line 19—19 of FIG. 1A;

FIG. 20 is an enlarged perspective view, partially broken away, of the screw hoist mechanism shown in FIG. 19;

FIG. 21 is an enlarged vertical section along the line 21—21 of FIG. 1A;

FIG. 22 is an enlarged perspective view of the screw hoist mechanism shown in FIG.21.

DESCRIPTION OF THE PREFERRED EMBODIMENTS

General description of the first preferred embodiment

Figure 1:
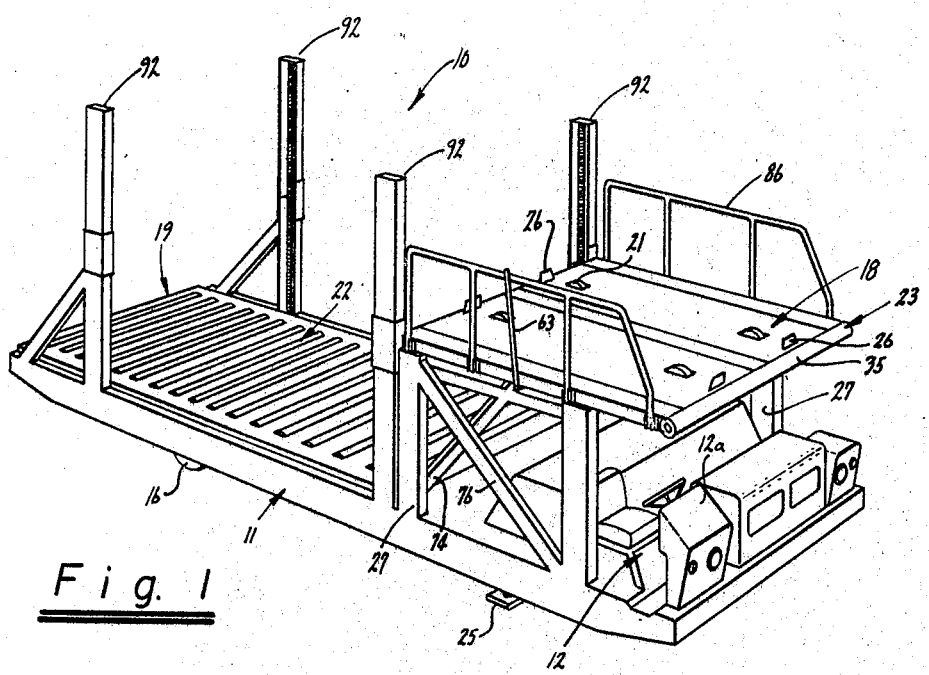
FIG. 1 is a perspective view of one preferred embodiment of the mobile loading apparatus of the present invention.

Referring to the drawings, 10 represents a mobile loading apparatus which is especially useful in the handling of cargo. As shown in FIGS. 1 and 1A, the apparatus or vehicle 10 is provided with a wheel equipped chassis or frame 11, at the forward end of which is an operator's or driver's station 12. The vehicle 10 is self-propelled, being driven by the steerable front wheels 13 (FIG. 2) which form a portion of a hydrostatically powered front-wheel drive assembly 14. The drive assembly includes an internal combustion prime mover coupled to an hydraulic pump (not shown), the latter being connected to a drive motor 15 which in turn drives the wheels 13 through the transmission and differential assembly 20. The rear support wheels 16, which may be of smaller size, are mounted upon the chassis 11 in pairs upon stub axles 17.

For rapid and safe loading and unloading of cargo from aircraft and the like, the vehicle 10 is provided with two elevators, a forwardly disposed loading or holding elevator 18 and a rearwardly disposed loading or load transfer elevator 19. Each elevator is provided with a bi-directional conveyor for the movement or transfer of pallets or cargo containers, the conveyor of the forward elevator 18 being designated 21 (FIGS. 5–8) and the conveyor of the rear elevator 19 being designated 22 (FIGS. 15–18). The elevators 18, 19 as well as the conveyors 21, 22 are each separately operable from a control console 12a which may be arranged conveniently at the driver's station 12 or, alternatively, on the forward elevator 18.

So that the terminal or loading end 23 of the forward elevator 18 may be aligned with canted or tilted cargo doors of aircraft and the like, a tilting or warping mechanism 33 is provided adjacent the forward end of the elevator 18, as best shown in FIG. 4. It will be understood that the loading end 23 of the elevator may be tilted to the left or right from the horizontal while the transfer and 24 of the elevator 18 is maintained substantially horizontal.

In general, the mobile loading apparatus 10 is operated by first positioning the vehicle's loading end 23 so that the holding elevator 18 is generally level with a cargo door of an aircraft. Then the deck of the elevator 18 is worked by selective operation of the warping mechanism 33, to align the loading end exactly with the cargo door. Assuming the aircraft is to be unloaded, the rear or load transfer elevator 19 is raised to level with the horizontally disposed transfer end 24 of the holding elevator 18. Palletized cargo is shifted from the aircraft across the loading end 23 onto conveyor 21. Cargo stops 26 adjacent to the ends 23, 24 of the holding elevator are disposed in the operative condition to halt further movement of cargo. After the rear elevator 19 is loaded with cargo, it is lowered to substantially the level of an associated vehicle or conveyor system (not shown), the cargo therefore being discharged from the rear elevator 19 by the conveyor 22. The rear elevator 19 may then be raised onto the aircraft, the above described operations are essentially reversed, it being understood that the conveyors 21, 22 are each bi-directional. To insure that the vehicle 10 is stationary during the loading operation, and to obviate possible lateral instability when the elevators are in a raised condition, retractable jacks 25 may be employed on each side of the chassis 11 near the longitudinal center of the elevator 18.

Forward or holding elevator 18

The forward or holding elevator 18 includes a platform assembly which may be warped from the horizontal; a bi-directional forward conveyor 21 for moving cargo across the platform; cargo stops 26 for arresting movement of pallets and the like with respect to the platform; and four hoist mechanisms 27 with associated drives 81 for raising and lowering carbon with respect to the vehicle chassis. The foregoing assemblies will be described below in the order listed.

Platform assembly

Figure 12:
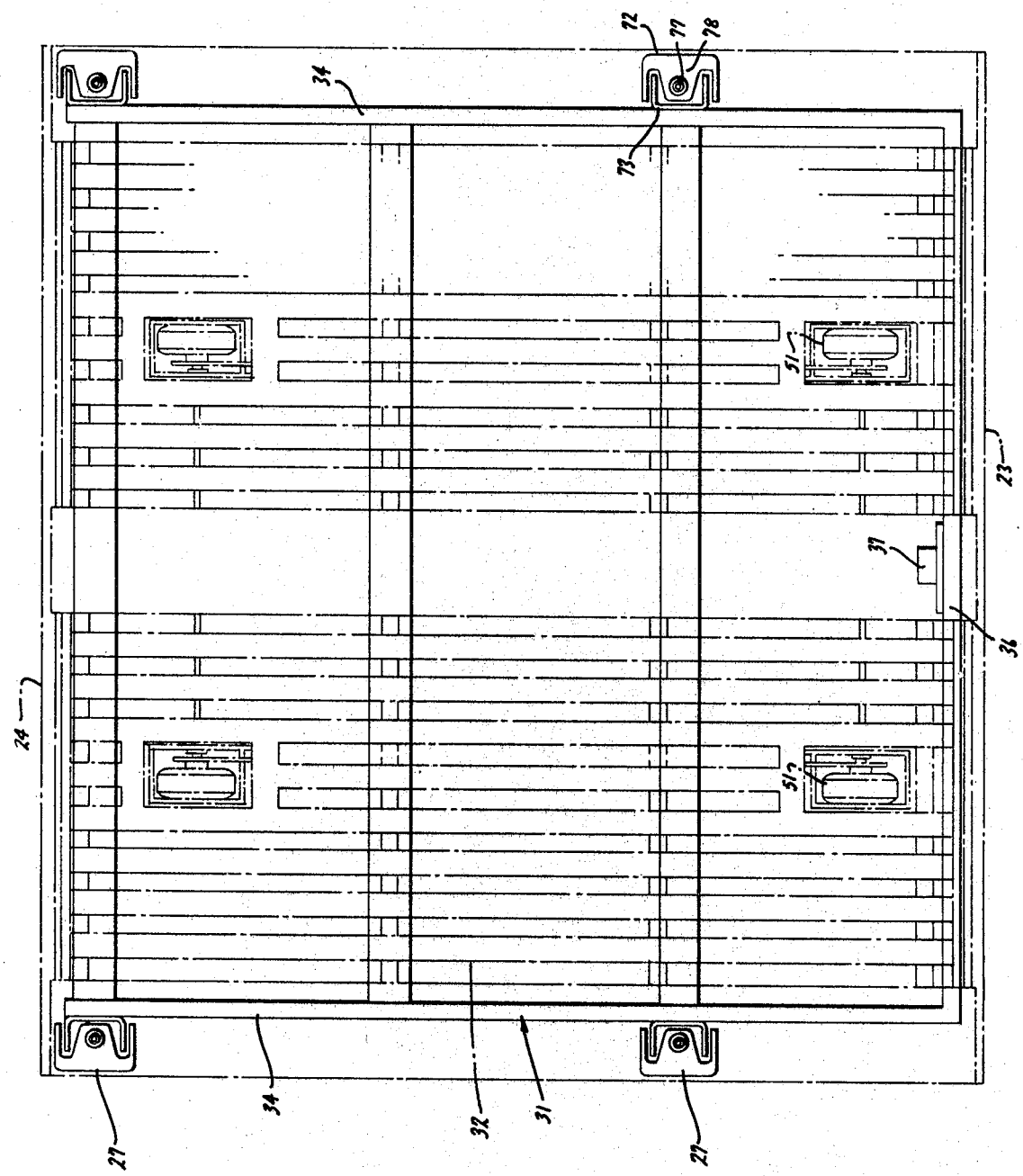
FIG. 12 is a horizontal section of the forward elevator along the line 12—12 of FIG. 3.

A preferred construction for achieving warping or tilting of the forward elevator platform so that the loading end 23 may be placed in the desired attitude, is shown in FIGS. 3, 6 and 12. More particularly, there is provided a perimeter sub-frame 31 upon which a relatively limber deck or platform 32 may be mounted, the former being secured to the sub-frame (FIG. 6) along the elevator transfer end 24. The cargo deck 32 is movably related to the sub-frame 31 along the loading end 23 (FIGS. 3 and 4) by means of the tilting or warping mechanism 33. As hereinafter explained, the mechanism 33 is operable to tilt the deck either to the left or to the right, as viewed in FIG. 3.

The sub-frame 31 may be fabricated from commercially available structural sections, as illustrated by the solid lines in FIG. 12. The two side members 34 of the sub-frame 31 are each suitably secured to two of the screw hoist assemblies 27. On a forward member 36 of the sub-frame, a metal block 37 is rigidly secured for supporting the terminal end of the cargo deck in its rocking or tilting movements.

The cargo deck or platform 32 may be fabricated from commercially available metal or like resilient structural members (such as the box section elements shown) and arranged as illustrated in FIGS. 4 and 8 and by the broken lines in FIG. 12. The transfer end 24 of the cargo deck is fixedly secured to the sub-frame as shown in FIG. 6. At the loading end of the deck there is provided a collapsible protective bumper 35, shown best in FIG. 1. On the underside of the loading end portion, a rocker beam 38 is arranged so that its center rests upon the metal block 37 of the subframe. From its center or medial portion, the beam 38 preferably tapers to its ends as shown in FIGS. 3 and 4.

The tilting or warping mechanism 33 is mounted between the rocker beam 38 and the front member 36 of the sub-frame. More specifically, adjacent each end of the member 36 there is pivotly mounted a bell crank 39, the two bell cranks being mounted in opposite hand. One arm of each bell crank is pivotaly connected to the rocker beam 38 through a link 41 and fixed tab 42, as shown in FIG. 3. An interconnecting link 43 is pivotly secured to the other arm of each bell crank. An hydraulic cylinder assembly 44 is mounted for operations between the member 36 of the subframe and the interconnecting link 43 whereby extension of the cylinder assembly (FIG. 3) will tilt the deck to the right as viewed in FIG. 3 while retraction of the cylinder assembly will cause the deck to pivot to the left.

Forward conveyor

The forward conveyor 21 is carried by the cargo deck 32, shown in FIGS. 7 and 8. The conveyor 21 is most useful for shifting relatively large pallets and cargo containers. When smaller varieties of cargo are being handled, it may be desirable to shift the forward conveyor 21 into an inoperative or out-of-the-way position and to rely on secondary roller conveyors or casters (not shown). More specifically (the forward conveyor comprises four rubber tired wheels 51 mounted in pairs adjacent each end of the deck (illustrated in broken lines in FIG. 12). A reversible hydraulic motor 52, powered from the main pump, supplies power to the pairs of wheels 51 in either direction through a chain and sprocket drive chain generally designated 53, as shown in FIGS. 7–10. Each wheel 51 is journaled upon an axle shaft 54 which extends through a bracket arm 56 pivotably mounted on the deck on a depending lug 57. The inwardly projecting end of each bracket arm 56 is connected to a linkage assembly including a bell crank 58, a cross arm 50 joined to a drive shaft 61 by a link 62 such that rotation of the shaft 61 by a lever 63 serves to pivot the bracket arm 56 on the lug 57 to raise or lower, as the case may be, the drive wheels of the forward conveyor. It will be understood that the chain and sprocket drive chain for the conveyor is provided with suitable idlers and tensioners to maintain chain tension irrespective of the height of the wheels 51 above the cargo deck.

Cargo stops

Two pairs of manually operable cargo stops 26 are mounted on the holding elevator at the ends of the cargo deck, best shown in FIG. 1. Referring now to FIGS. 5, 8 and 11, it will be seen that each cargo stop 26 includes a paddle shaped plate 66 secured to an arm 67, which is pivotally mounted at a medial portion to the cargo deck at a depending tab 68. A stop member 69 is rigidly secured to the arm and formed to engage the underside of the deck when the plate 66 is depressed, as by a workman's foot, against the bias of a spring 71. Upon such actuation, the stop member moves to the position shown in broken lines in FIG. 11. The plate 66 projects above the cargo deck to engage the pallet or cargo container supported thereto to insure that the cargo is not accidentaly conveyed off of the forward elevator 18. On the other hand, when the rear elevator 19 is in a horizontally aligned condition with the forward elevator, the workmen standing on either side of the cargo deck simply depress the stop plates 66 to permit the forward conveyor to move the cargo onto the aft elevator. In a loading operation the cargo stops 26 also prevent movement of pallets and like cargo carriers from the rear to the forward elevator, before the workmen are ready.

Forward screw hoist assembly

Figure 23:
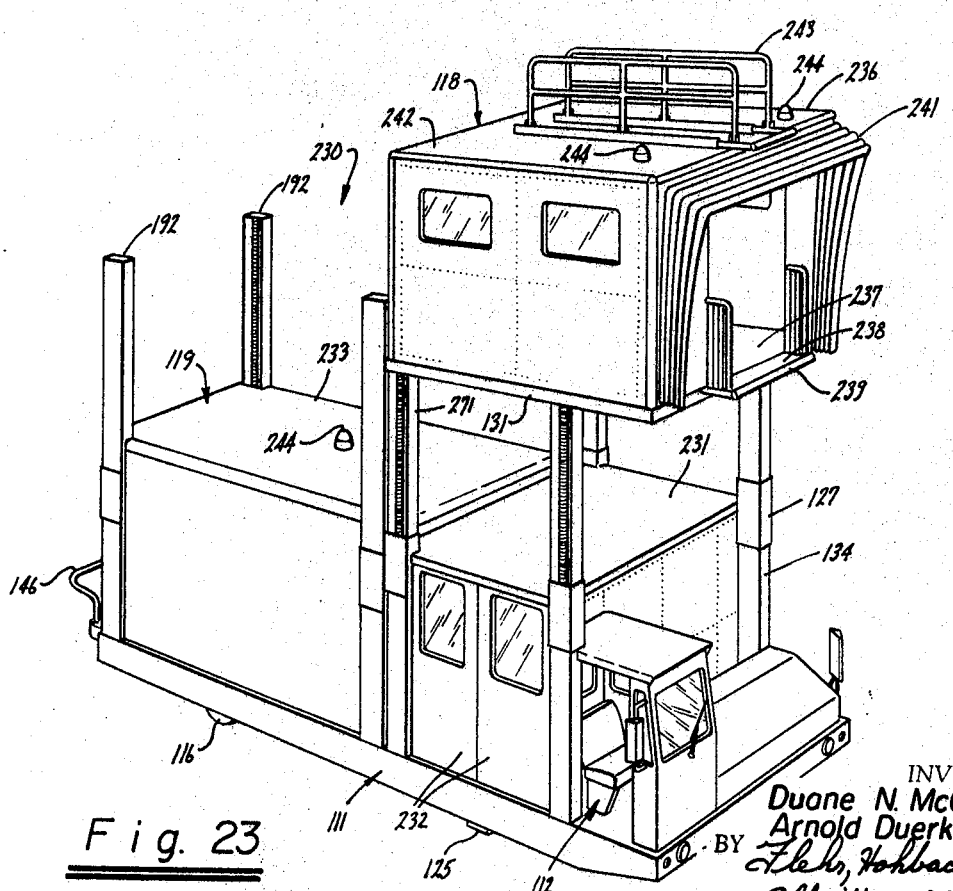
FIG. 23 is a perspective view of a second preferred embodiment of the mobile loading apparatus of the present invention.

Four screw hoist assemblies 27 are mounted upon the vehicle chassis 11, at the locations illustrated in FIGS. 1, 1A, 2 and 12, to raise and lower the holding elevator 18. More particularly, each of the front hoist assemblies 27 includes a channel shaped column 72 rigidly secured to the chassis 11, and a movable channel support 73 rigidly secured to the sub-frame 31 (FIGS. 1A, 22 and 23). The rearwardly disposed columns 72 are adequately braced laterally and longitudinally by the structural members 74 and 76, respectively. In each assembly 27, an elongated hoist screw 77 is suspended from the top of a support and guide bracket assembly 78 by means of a thrust bearing 79. As more specifically described in my copending application Ser. No. 687,712, filed Dec. 4, 1967, the hoist screws 77 are driven by a screw drive assembly 81, mounted on the chassis 11 at the lower end of the hoist screws 77, to raise and lower the elevator.

The column supports 73 are mounted upon the hoist screws 77 by means of a ball nut and guide assemblies 82, fixedly secured to each of the supports 73. Guide rollers 83 are provided for holding the guide assemblies and supports 73 in the desired aligned relationship within the columns 72 during the vertical movements of the elevator. Within each assembly 82, a ball nut (not shown) of the Saginaw type surrounds the hoist screw 77, whereby rotation of the screw 77 serves to advance the ball nut and guide assembly and in turn the support 73 and elevator vertically with respect to the column 72. A drive train 84 is mounted in the chassis 11 as shown in FIGS. 1A and 2 to rotate the four hoist screws 77 in synchronism from a reversible hydraulic motor which is powered from the main pump.

The forward elevator may be operated from conventional controls (not shown) disposed on the cargo deck and may be raised and lowered conveniently from that position. When the device 10 is moving to another location the forward elevator may be lowered to occupy a position just above the driver's station 12, to thereby obtain the low overhead clearance which is desired when working near aircraft. A hand rail 86 is mounted upon each side of the cargo (FIG. 1) as a safety feature for workmen. Each hand rail may be pivoted to a horizontal, out-of-the-way position when vertical clearance is needed.

Rear or load transfer elevator 19

Figure 16:
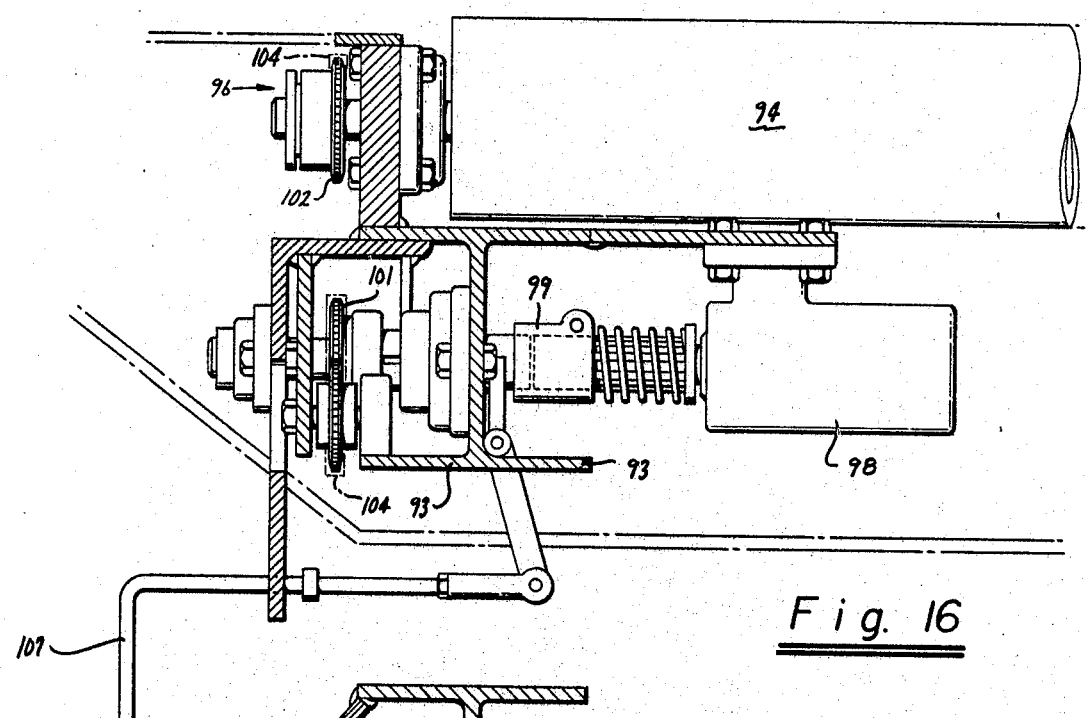
FIGS. 16 to 18 are each fragmentary sectional views, showing details of the rear conveyor, along the lines 16—16, 17—17 and 18—18 respectively, of FIG. 15.
Figure 17:
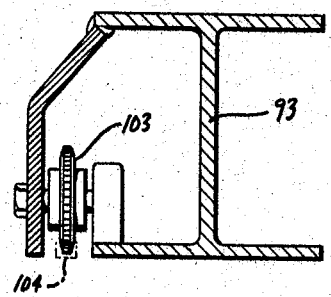
Figure 18:
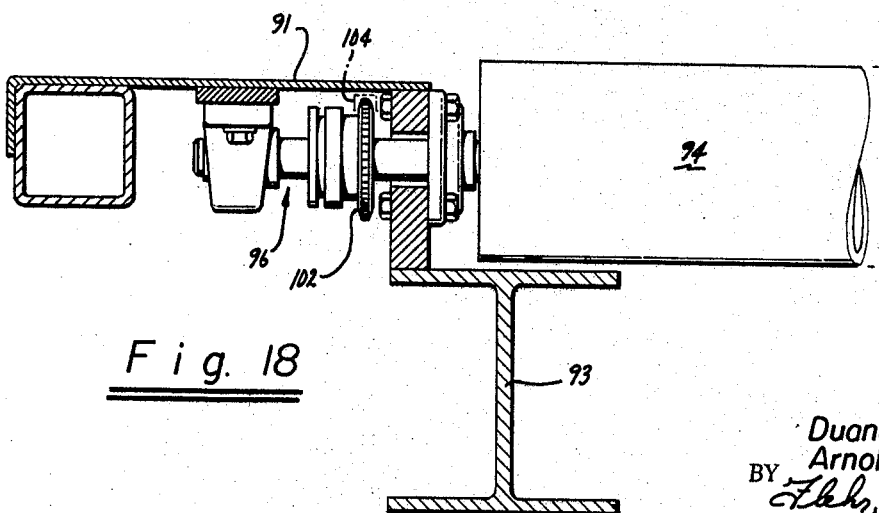

The rear or load transfer elevator 19 includes a rear conveyor 22 arranged in an elevator deck 91, which is connected to four rear screw hoist mechanisms 92 (FIGS. 1, 1A, 14–16, 19–20). The elevator deck 91 may be fabricated from commercially available structurals arranged as shown in FIGS. 14–18, to provide a rectangular frame 93 for supporting a plurality of powered rolls 94 comprising the rear conveyor 22. The rolls are suitably supported on the frame 93 by the journal and bearing assemblies 96 (FIGS. 16 and 18). The rolls 94 extend laterally across the elevator deck and are arranged to extend slightly above the cross members 97 disposed between adjacent rolls.

A reversible hydraulic motor 98, powered from the main pump, drives through a manually actuatable clutch and directional control unit 99 to support power to a drive sprocket 101. A sprocket 102 is provided for each roll 94, and idler sprockets 103 are arranged along the frame 93 to maintain the desired tension within a drive chain 104 in cooperation with a chain tensioner 106. Thus, the rear conveyor 22 may be placed in operation by movement of a hand control 107 (FIG. 16) to engage the clutch 99, permitting the motor 98 to drive the rollers 94 through the chain and sprocket arrangement in the desired direction.

Rear screw hoist assembly

For raising and lowering the load transfer elevator 19, four screw hoist assemblies 92 are mounted upon the vehicle chassis 11 at the locations illustrated in FIGS. 1, 1A and 2. More particularly, each of the rear hoist assemblies 92 includes a channel shaped column 111 rigidly secured to the chassis 11 (FIG. 20). An elongated hoist screw 112 is suspended from each of the support plates 113 by means of the thrust bearing assemblies 79. A screw drive assembly 81 is mounted upon the chassis 11 at the lower end of one of the hoist screws 112 for raising and lowering the elevator deck 91 through the drive train 122 hereinafter described.

At four locations designated 116 in FIG. 13, the elevator deck 91 (specifically its frame 93) is equipped with openings to receive the pintles 117 (FIG. 20) mounted in the yokes 118. The latter are pivotally connected to the spaced apart support plates 119 which support ball nuts of the Saginaw type which, as previously described, co-operate with the hoist screws 112 to vertically move the elevator 19 in response to rotation of the screws. Guide rollers 121 are provided to maintain the ball-nut supports 119 in proper alignment as the hoist screws 112 are vertically traversed.

The drive train 122 (illustrated in FIGS. 1A and 2) is arranged in the chassis 11 to drive the four hoist screws 112 from a reversible hydraulic motor 126, through a clutch 127. The motor 126 is powered from the main pump. The controls for the motor 126 are conventional and may be arranged at the operator's or driver's station 12 or, if desired, upon the forward or holding elevator, so that the two elevators may be easily horizontally aligned for transferring cargo from one to the other.

Operation

The mobile loading apparatus 10 is suitable for handling cargo such as loading and unloading aircraft, railroad cars and the like. In addition to loading and unloading cargo, the vehicle 10 may serve as a cargo transporter to carry palletized loads or cargo containers from place to place within the cargo handling area.

In the operation of unloading cargo containers or pallet loads from an aircraft, the vehicle 10 is driven across the airport apron to a position adjacent the cargo door of the aircraft. It will be assumed that the forward or holding elevator 18 at this time is in a lowered condition, disposed just over the head of the driver at his station 12. The forward elevator 18 is then raised through operation of the front screw hoist assemblies 27 to place the cargo deck 32 at approximately the same elevation as the lower edge of the aircraft cargo door, or at a level substantially co-extensive with conveyor apparatus within the aircraft. If the cargo supporting surface of the aircraft is slightly skewed or canted from the horizontal, the loading end 23 of the forward elevator may be warped through use of the tilting mechanism 33, while maintaining the transfer end of the elevator substantially horizontal. Alternatively, the forward elevator may be raised to a height such that the wheels of the forward conveyor 21 are in approximately the same plane as the conveyor apparatus disposed within the aircraft. In either event, a loaded pallet or cargo container may be extended from the aircraft onto the forward conveyor 21 and the forward cargo stops 26 are lowered. The cargo can now be moved by the conveyor until the rear cargo stops 26 (at the rear of the forward elevator) are engaged. The rear elevator 19 is now raised level with the forward elevator, the rear cargo stops 26 depressed, and the forward conveyor actuated to move the cargo from the cargo deck 32 onto the rear conveyor 26. The rear elevator is next lowered through operation of the rear screw hoist assemblies 92 until the elevator deck 91 is at a desired low level to permit cargo units to be shifted readily to any of a wide variety of receiving units, such as trucks, conveyor systems, motorized cargo transporters and the like. When the rear elevator is in the desired lowered condition, the rear conveyor can again be actuated to shift the cargo onto such associated conveying equipment. During this operation, another cargo load may be simultaneously shifted from the aircraft onto the forward elevator so as to be in position when the rear elevator is returned to the raised position.

In a loading operation the unloading steps described above are reversed. More particularly, cargo (e.g. on pallets or in cargo containers) is moved from the associated conveying equipment onto the rear elevator 19. After the cargo has been properly positioned on the elevator 19, the elevator is raised level with the forward elevator and particularly with the forward conveyor 21. The rear cargo stops 26 are depressed so that upon actuation of the rear conveyor, the cargo is shifted onto the forward conveyor and moved by it into the aircraft fuselage, the forward cargo stops 26 of course being depressed to permit this full movement.

From the above it will be understood that there has been described a highly useful mobile cargo handling apparatus which is flexibly adapted to loading and unloading operations with respect to a wide variety of transport vehicles and which fulfills all of the objects and advantages set out above.

Description of the second preferred embodiment

Referring specifically to FIG. 23, 230 represents a mobile loading apparatus which is especially useful in transport and handling of aircraft passengers. As will be apparent from a comparison of the structures in FIGS. 1 and 23, the vehicle 230 is similar structurally and functionally to the vehicle 10, previously described.

As illustrated, the vehicle 230 includes a driver or operator's station 112, a steerable front wheel assembly (not shown) and rear wheels 116 mounted upon a chassis 111. The vehicle 230 is provided with two elevators, a forwardly disposed holding elevator 118 and a rearwardly disposed transfer or loading elevator 119. The forward or holding elevator 118 is provided with four screw hoist assemblies 127 each mounted upon an extension column 234, and the aft elevator 119 is provided with four screw hoist assemblies 192.

The chassis 111 immediately to the rear of the driver's station 112 is provided with a room-like passenger exit and entry compartment 231. The compartment 231 is disposed immediately below the elevator 118 and suitable stops are provided on the screw hoist assembly 127 to arrest movement of the elevator 118 just above the roof of the compartment 231. A pair of outwardly opening doors 232 are mounted at the right side wall of the compartment 231 to permit passengers to exit and enter the vehicle 230.

A room-like enclosure or cabin 233 is likewise arranged on the rear elevator 119, the cabin or enclosure 233 being open at the end adjacent to the compartment 231 so as to permit passengers to move from the compartment to the cabin when the rear elevator 119 is in a lowered condition. Suitable safety means may be provided at the open end of the cabin 233 to preclude passengers from falling into the operating mechanism. The elevator 119 and the associated enclosure 233 are elevated by the screw hoist assemblies 192 between lowered and elevated conditions.

Secured to the sub-frame 131 of the forward or holding elevator 118 is a cabin or enclosure 236 having a floor 237, which is preferably constructed and arranged to be warpable in the same manner as the cargo deck 32 of the mobile handling apparatus 10. The terminal or loading end 238 of the elevator 118 is equipped with a short extension provided with a deformable bumper 239. An extensible shield 241 is mounted on the enclosure 236 so as to conform the unit closely to the outside of an aircraft fuselage and thereby to protect the passengers from the elements. The wall of the cabin or enclosure 236 adjacent the rear elevator 119 is open for access to the rearwardly disposed cabin 233 when the same is raised coplanar with the floor 237 of the front cabin or enclosure 236.

For maintenance and guidance work, the roof 242 of the enclosure 236 is equipped with a spaced pair of rails 243. Safety warning lights 244 can be arranged on the roof surfaces of both the front and rear enclosures 236 and 233. A guard rail 246 can also be arranged along the rear of the chassis 111 so as to protect the vehicle. A pair of selectively-retractable jacks 125 mounted upon the chassis 111 can afford additional lateral stability to the vehicle 230, during the operation of its elevator structures.

Operation

In a passenger handling operation, where passengers are to be conveyed between an airport terminal and a waiting aircraft, the mobile handling apparatus 230 is driven to a position near the terminal exit doors. At this time the forward enclosure or cabin 236 and elevator 118 may be in a lowered condition, disposed closely adjacent to the roof of the passenger compartment 231. Passengers enter the vehicle 230 through the doors 232 and may either remain in the compartment 231 or may stand on the elevator 119 within the cabin or enclosure 233. Should there be a sufficient number of passengers, both the enclosure 233 and compartment 231 may be occupied with passengers for transport to the waiting aircraft. Upon reaching the aircraft the vehicle operator at the station 112, or an assistant stationed at a control console (not shown) within the front cabin 236, causes the elevator 118 to be raised so that the loading end portion 238 is in approximate alignment with the lower edge of the aircraft's passenger loading door. The vehicle 230 may be "inched" so that the bumper 139 is very close to the side of the fuselage. Should the aircraft be tilted from horizontal, the floor 237 of the elevator 118 may be tilted correspondingly by actuation of linkage described in connection with the elevator 18 of the vehicle 10. Such operation functions to tilt the floor 237 to a complimentary position with respect to the aircraft floor, so that the passengers may walk easily over a virtually continuous surface. When the front cabin 236 is properly positioned, the operator may elevate the rear elevator 119 so that the confronting end portions of the two elevators are in horizontal alignment, insuring a smooth floor surface from the rear cabin 133 through the forward cabin 136 and into the aircraft. Suitable safety appliances (not shown) prevent passengers from moving from either cabin while the same is being positioned. Should there be additional passengers waiting in the compartment 231 below, the rear elevator 119 can now be lowered to receive them, and the above operation repeated.

An operation wherein passengers are unloaded from an aircraft essentially comprises a reverse of the above steps.

From the above it will be understood that there has been described a highly useful mobile passenger loading apparatus which protects passengers from the elements during transport between an aircraft and an airport terminal building. The vehicle eliminates the occasion for passenger exertion in negotiating stairs in transfers to and from the aircraft. A further advantage is that the aircraft may be "spotted" on the terminal apron at a considerable distance from the terminal building. Thus, through use of the apparatus 230, more aircraft can be accommodated about the terminal building without any increase in passenger exertion or discomfort.

While this description is related to two embodiments of the mobile loading apparatus, it is to be understood that many changes in construction in widely different embodiments and applications of the invention will suggest themselves to those skilled in the art to which this invention pertains. The disclosure and description herein are therefore to be considered illustrative and not in any sense limiting, except as expressed in the appended claims.

What is claimed is:

1. Mobile loading apparatus comprising a chassis powered for movement over the ground, a holding elevator mounted on a forward portion of said chassis, means on said chassis for operating said holding elevator to obtain a desired loading elevation of the same, a load transfer elevator mounted on a rear portion of said chassis, separate means to operate said load transfer elevator between lowered positions and positions in alignment with said holding elevator, and means on said holding elevator to warp a loading end portion of said elevator to a position which is non-coplanar with remaining portions of said elevator, said warping means being operable to align said loading end portion with non-horizontal supporting surfaces of transport vehicles.

2. Mobile loading apparatus comprising a chassis powered for movement over the ground, a holding elevator mounted on a forward portion of said chassis, means on said chassis for operating said holding elevator to obtain a desired loading elevation of the same, a load transfer elevator mounted on a rear portion of said chassis, separate means to operate said load transfer elevator between lowered positions and positions in alignment with said holding elevator, and compartment means on said chassis adjacent to a forward portion thereof to facilitate passenger exit and entry, said load transfer elevator being equipped with a first enclosure serving to protect passengers from the elements, said load transfer elevator when in a lowered position thereof placing said first enclosure thereon in communication with said compartment means for exit and entry, said holding elevator being equipped with a second enclosure serving to protect passengers from the elements, said load transfer and said holding elevators being vertically movable to positions of elevation which are generally horizontal, coplanar and continuous and wherein said first and second enclosures are in communication serving to permit passengers to move from one to the other of said elevators.

3. Mobile loading apparatus comprising a chassis powered for movement over the ground, a holding elevator mounted on a forward portion of said chassis, means on said chassis for operating said holding elevator to obtain a desired loading elevation of the same, a load transfer elevator mounted on a rear portion of said chassis, separate means to operate said load transfer elevator between lowered positions and positions in alignment with said holding elevator, and compartment means on said elevators to protect passengers from the elements and to facilitate passenger exit and entry, said compartment means including a first enclosure mounted on said load transfer elevator whereby passenger loading is facilitated in a lowered position thereof, said compartment means additionally including a second enclosure on said holding elevator to facilitate the loading and unloading of passengers with respect to said transfer elevator and an adjacent aircraft, said load transfer and said holding elevators being vertically movable to positions of elevation which are generally horizontal, coplanar and continuous and wherein said first and second enclosures are in communication serving to permit passengers to move successively from one to the other of said elevators and in and out of said aircraft.

4. Mobile loading apparatus as in claim 3 wherein said compartment means is arranged on said chassis below said holding elevator.

5. Mobile loading apparatus comprising a vehicular frame powered for movement over the ground, a first loading elevator operatively mounted on said frame, a second loading elevator operatively mounted on said frame adjacent said first elevator, said first and second elevators being vertically movable to positions of elevation which are generally horizontal, co-planar and continuous, and means cooperating with said first elevator to warp a loading end portion thereof to a position which is non-coplanar with remaining portions of said first elevator, said warping means being operable to align said loading end portion with non-horizontal supporting surfaces of transport vehicles.

6. Mobile loading apparatus as in claim 5 wherein conveyor means are operatively arranged on said first and second elevators to transmit cargo thereacross and with respect to the supporting surfaces of said transport vehicles 7. Mobile loading apparatus as in claim 5 wherein each of said rear and forward elevators includes a plurality of upstanding supports mounted on the vehicular frame, screw hoist mechanisms suspended from each of said upstanding support means, and load supporting platform means operatively connected to said screw hoist mechanisms whereby the load supporting platforms of each of said elevators is operated and supported by said screw hoist mechanisms.

8. Apparatus as in claim 5 wherein said first elevator includes a subframe carrying a loading platform, said subframe and loading platform being rigidly maintained in co-planar relationship at one end thereof, said warping means including pivot means on an opposite end of said subframe and loading platform and positioned therebetween and means to operate said pivot means to warp the opposite end of said loading platform to a tilted attitude with respect to said subframe.

9. The mobile loading apparatus defined in claim 5 wherein said first elevator includes: a generally horizontally disposed, vertical moveable subframe, a generally limber deck mounted upon said subframe, said warping means including pivots mounted on said subframe adjacent opposite side portions thereof proximate said loading end of said elevator, means rigidly securing the opposite end portion of said deck to said subframe, rotatable lifting means mounted on each pivot serving selectively to raise and to lower the side portions of said deck adjacent said loading end with respect to said subframe, means interconnecting said rotatable lifting means serving to permit raising one side portion of said deck and lowering the other, said interconnecting means and said rotatable lifting means being arranged so that the loading end portion of said deck may be selectively positioned in substantially horizontal attitudes and alternatively in warped, tilted attitudes in which one side is raised while the other is lowered, and means serving to selectively rotate said rotatable lifting means for warping of said deck.

10. The mobile loading apparatus defined in claim 9 wherein said rotatable lifting means include a bell crank mounted at its neutral point upon said pivot means.

11. Mobile loading apparatus comprising a vehicular frame, power means for moving said vehicular frame over the ground, a holding elevator mounted on a forward portion of said vehicular frame, means operating said holding elevator to obtain a desired loading elevation of the same, a load transferring elevator mounted on a rear portion of said vehicular frame, separate means to operate said load transferring elevator between lowered positions and positions in alignment with said holding elevator, means cooperating with said holding elevator to warp a forward loading end of the same to effect the alignment of said loading end with the tilt of a load receiving support surface.

12. Mobile loading apparatus as in claim 11 wherein said holding elevator is constructed in the form of a generally limber platform mounted on a subframe, one end of said platform being rigidly connected to said subframe so as to remain in substantially parallel relationship thereto, the other loading end of said platform being substantially free, said warping means including pivot means positioned between the subframe and the loading end of said platform whereby the latter can be warped to a tilted position with respect to said subframe.

13. Mobile loading apparatus for handling cargo with respect to aircraft, a chassis powered for movement along the ground, first, forwardly disposed and second, rearwardly disposed elevators operatively mounted on said chassis for vertical movements between desired cargo loading and unloading positions, each said elevator being provided with a cargo supporting platform, first and second conveyor means mounted respectively on the platforms of said first and second elevators, said elevators being arranged so that in the elevated condition, the cargo platforms of said elevators are generally horizontal and co-planar whereby cargo may be moved thereacross by said conveyor means, said second elevator having a lowered position relatively near the ground serving to facilitate loading and unloading of said second cargo platform, said first cargo platform having cargo stops thereon serving to arrest movement of cargo thereacross when said second elevator is in the said lowered position, means on a forward loading portion of said first elevator cargo platform for warping said platform to align one end of the same with an associated aircraft cargo door, and means on said first elevator to maintain the opposite end of said cargo platform substantially horizontal for ready alignment with said second cargo platform in the raised condition thereof.

14. The mobile loading apparatus defined in claim 13 wherein said first conveyor means on said first elevator is arranged for shifting from a raised position for conveying cargo across said cargo supporting platform to a lowered out-of-the-way position below the platform surface, whereby cargo is frictionally held in a stationary position in the lowered position of said conveyor means.

References Cited

UNITED STATES PATENTS

| | | | |
|---|---|---|---|
| 2,929,655 | 3/1960 | Hurter | 214—512 |
| 3,119,350 | 1/1964 | Bellingher | 214—512 XR |
| 3,259,255 | 7/1966 | Cresci | 105—370 XR |

ALBERT J. MAKAY, Primary Examiner

U.S. Cl. X.R.

180—89; 187—25; 105—370